US012776605B2

(12) United States Patent
Anthony et al.

(10) Patent No.: US 12,776,605 B2
(45) Date of Patent: Oct. 27, 2026

(54) MODULAR CONNECTOR ASSEMBLY

(71) Applicant: TE Connectivity Solutions GmbH, Schaffhausen (CH)

(72) Inventors: Alexander James Anthony, Middletown, PA (US); Daniel Volkmann, Bensheim (DE); Marc Reinhardt, Bensheim (DE); Matthew Steven Houser, Middletown, PA (US)

(73) Assignee: TE Connectivity Solutions GmbH (CH)

( * ) Notice: Subject to any disclaimer, the term of this patent is extended or adjusted under 35 U.S.C. 154(b) by 409 days.

(21) Appl. No.: 18/305,412

(22) Filed: Apr. 24, 2023

(65) Prior Publication Data

US 2024/0356265 A1 Oct. 24, 2024

(51) Int. Cl.
*H01R 13/436* (2006.01)
*H01R 13/514* (2006.01)

(52) U.S. Cl.
CPC ....... *H01R 13/4361* (2013.01); *H01R 13/514* (2013.01)

(58) Field of Classification Search
CPC .............. H01R 13/514; H01R 13/4361; H01R 13/4362; H01R 13/4365; H01R 13/4368
USPC ......................................... 439/712, 717, 752
See application file for complete search history.

(56) References Cited

U.S. PATENT DOCUMENTS

| | | | | | |
|---|---|---|---|---|---|
| 5,288,251 | A * | 2/1994 | Sumida | H01R 13/514 | 439/701 |
| 5,358,427 | A * | 10/1994 | Miwa | H01R 13/4362 | 439/752 |
| 6,332,811 | B1 * | 12/2001 | Sato | H01R 13/506 | 439/701 |
| 7,572,154 | B2 * | 8/2009 | Ichio | H01R 13/514 | 439/701 |
| 7,628,648 | B1 * | 12/2009 | Tan Chin Yaw | H01R 13/4365 | 439/595 |
| 7,695,315 | B2 * | 4/2010 | Hitchcock | H01R 13/4223 | 439/701 |
| 7,955,127 | B2 * | 6/2011 | Sakamoto | H01R 13/521 | 439/587 |
| 8,747,168 | B2 * | 6/2014 | Kida | H01R 13/506 | 439/701 |
| 9,484,660 | B2 * | 11/2016 | Shuey | H01R 13/4362 | |
| 9,673,559 | B1 * | 6/2017 | Rossman | H01R 12/7011 | |
| 9,673,560 | B2 * | 6/2017 | Lihoshi | H01R 13/4361 | |
| 9,722,341 | B2 * | 8/2017 | Chikusa | H01R 13/4223 | |
| 10,205,264 | B2 * | 2/2019 | Washio | H01R 31/08 | |
| 11,031,724 | B2 * | 6/2021 | Hiei | H01R 13/424 | |
| 11,171,437 | B2 * | 11/2021 | Arai | H01R 13/424 | |

(Continued)

*Primary Examiner* — Marcus E Harcum

(57) ABSTRACT

A modular connector assembly comprises a plurality of interconnected bodies, including a first body and a second body. The first body defines at least a first portion of a first terminal space sized to receive a terminal of a first type in an insertion direction. A connecting element detachably connects the first body to the second body. The second body is movable relative to the first body between a first position and a second position via the connecting element. The connecting element may be embodied as a terminal position assurance (TPA) element. The TPA element is arranged outside of the first terminal space in the first position and arranged within the first terminal space in the second position for engaging with the terminal of the first type.

19 Claims, 16 Drawing Sheets

(56) References Cited

U.S. PATENT DOCUMENTS

| | | | | |
|---|---|---|---|---|
| 12,046,848 | B2 * | 7/2024 | Sekino | H01R 13/6273 |
| 2001/0053631 | A1 * | 12/2001 | Nagai | H01R 13/514 439/625 |
| 2002/0056193 | A1 * | 5/2002 | Saitoh | H01R 4/2466 29/857 |
| 2012/0225576 | A1 * | 9/2012 | Kida | H01R 13/506 439/345 |
| 2016/0141790 | A1 * | 5/2016 | Martin | H01R 13/4362 439/712 |
| 2020/0136300 | A1 * | 4/2020 | Tsukiyoshi | H01R 13/424 |
| 2021/0167543 | A1 * | 6/2021 | Oka | H01R 13/514 |
| 2023/0163510 | A1 * | 5/2023 | Ito | H01R 13/582 439/752 |

* cited by examiner

910

MODULAR CONNECTOR ASSEMBLY

FIELD OF THE INVENTION

The present invention relates to connectors, and more particularly, to a modular electrical connector assembly including terminal position assurance devices or elements.

BACKGROUND

Current electrical connectors, such as those used in RF and data transmission systems, suffer from several drawbacks which must be addressed for their successful implementation into a variety of new applications. For example, existing connectors lack the modularity need for future automation processes. This lack of modularity increases the number of required connector housings, and thus increases tooling and assembly costs. Moreover, current connectors are unnecessarily large. Further still, electrical connector systems often suffer from assembly errors. These errors include, for example, the incorrect or insufficient insertion of the conductive terminals of the connector within a corresponding housing. As a result, electrical connectors often implement a terminal position assurance (TPA) device or component, which ensures that a partially seated terminal is detected during assembly or mating of the connector system. In this way, an operator may identify and remedy a terminal placement issue during the connector assembly or connector mating processes, avoiding connector damage and/or a failed or unreliable connections.

Accordingly, there is a need for improved connector systems, including space efficient, modular systems implementing TPA devices.

SUMMARY

In one embodiment of the present disclosure, a modular connector assembly comprises a plurality of interconnected bodies, including a first body and a second body. The first body defines at least a first portion of a first terminal space sized to receive a terminal of a first type in an insertion direction. A connecting element detachably connects the first body to the second body. The second body is movable relative to the first body between a first position and a second position via the connecting element. The connecting element may be embodied as a terminal position assurance (TPA) element. The TPA element is arranged outside of the first terminal space in the first position and arranged within the first terminal space in the second position for engaging with the terminal of the first type.

BRIEF DESCRIPTION OF THE DRAWINGS

The invention will now be described by way of example with reference to the accompanying Figures, of which.

DETAILED DESCRIPTION OF THE EMBODIMENTS

Figure 3:
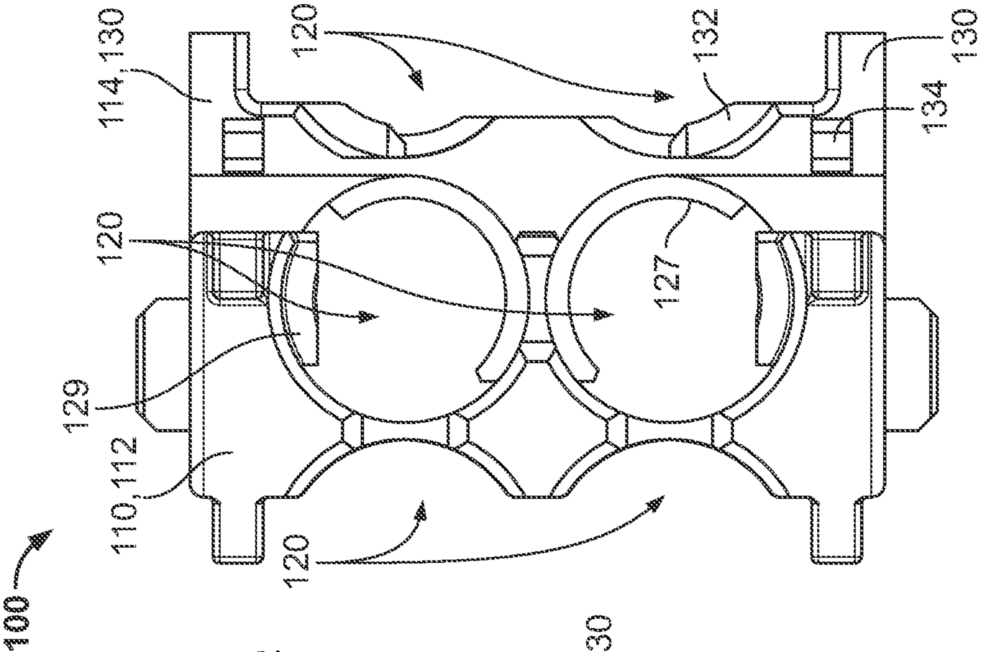
FIG. 3 is a top view of the connector module of FIG. 1.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure relates to modular connector assemblies, each including a plurality of individual bodies or modules. The modules are standardized for a given terminal type, and may be connected together in varying numbers and/or module and terminal types. In this way, the modules are adapted to form customizable connections depending on the application and associated design criteria. The modules or housings may include integrally formed TPA elements, replacing the need for separate TPA devices.

More specifically, embodiments of the present disclosure include connector modules, module assemblies and subassemblies, and connectors implementing the same. For example, a connector assembly according to an embodiment of the present disclosure includes a plurality of interconnectable bodies (also referred to herein as housings or modules), including at least a first body and an identical second body. The first body defines a first portion of a first terminal space sized to receive a terminal of a first type in an insertion direction. The second body is movably connected to the first body between a first position and a second position relative to the first body. The second body defines a TPA element connecting the first body and the second body. The TPA element is arranged outside of the first terminal space in the first position and arranged within the first terminal space in the second position for engaging with the terminal. The second body further defines a TPA lock of latch selectively securing the second body in the first position and the second position, as well as a second portion of the first terminal space. With the second body in the first position, the terminal is insertable into the first terminal space in the insertion direction. With the second body in the second position, the terminal is fixed within the first terminal space by the TPA element.

The standardized or modular nature of the housings according to embodiments of the present disclosure permits easy and efficient scaling and/or customization, facilitates automated production, and reduces the number of required molds and associated tooling costs. Further, the offset nature of the modules and/or terminal openings reduces the required pitch between terminals, decreasing overall connector size.

Figure 2:
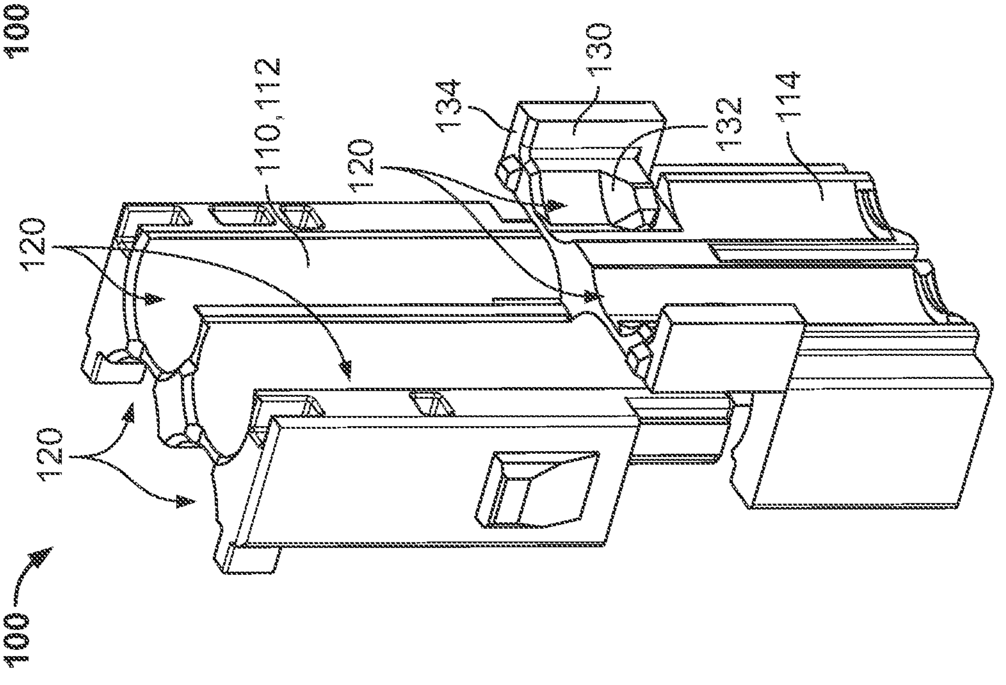
FIG. 2 is a side perspective view of the connector module of FIG. 1.
Figure 1:
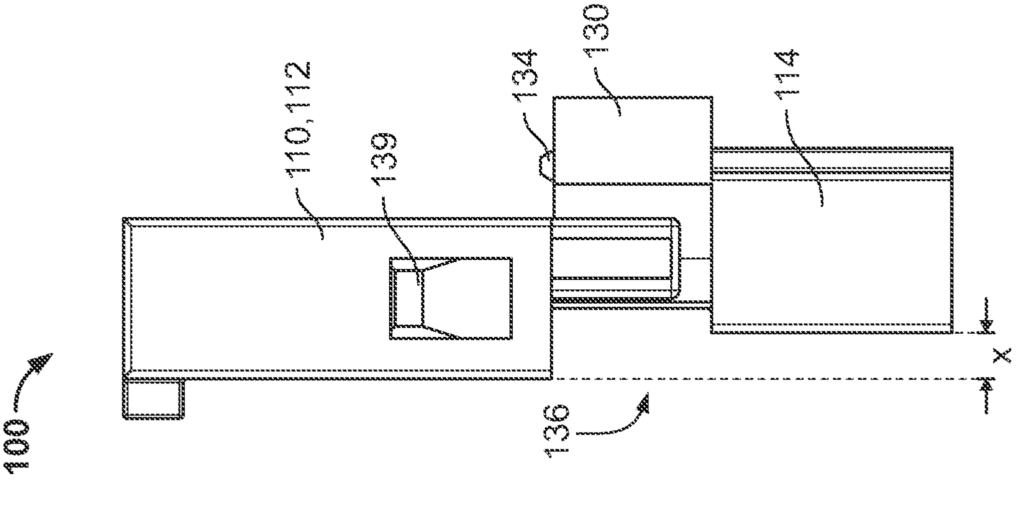
FIG. 1 is a side view of a connector module or housing of a first type according to an embodiment of the present disclosure.

Referring generally to FIGS. 1-3, an exemplary connector module 100 of a first type is illustrated (e.g., a coaxial, FAKRA-type connector). The module 100 comprises a body or housing 110 (e.g., a unitary molded piece). The body 110 includes an upper portion 112 and a lower portion 114. As shown in FIG. 1, the upper and lower portions 112, 114 are offset from one another in a lateral direction by a distance X. This offset enables a reduction in required terminal pitch or spacing, as described in detail herein.

Figure 4:
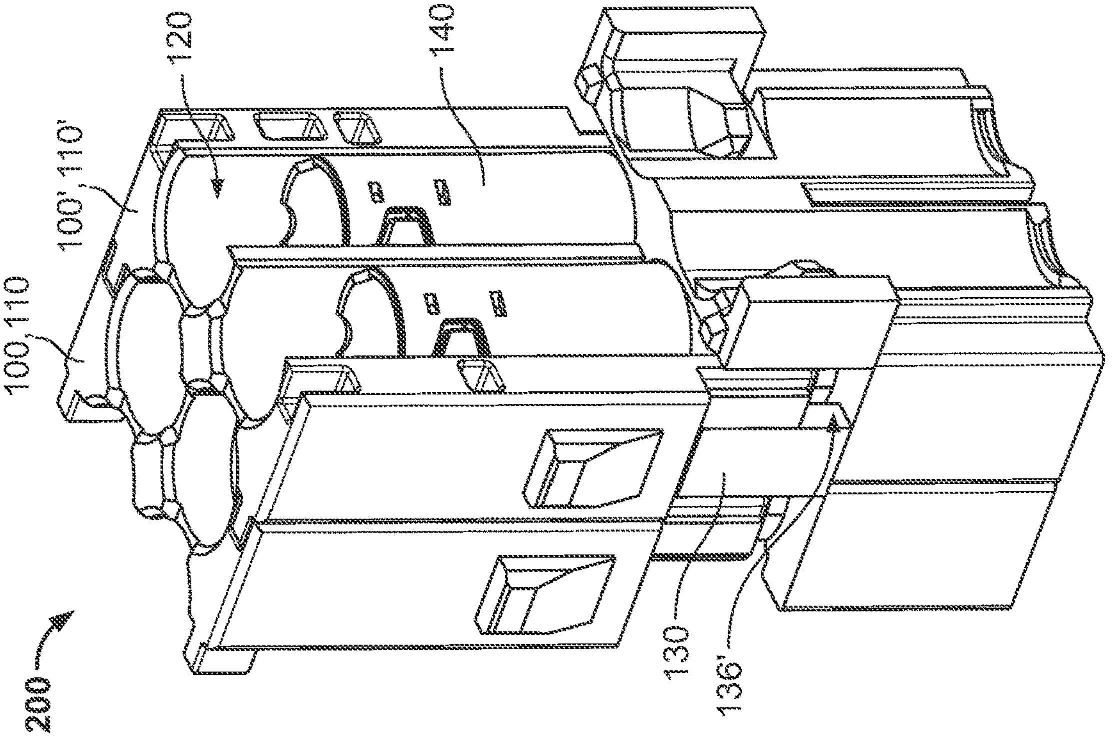
FIG. 4 is a side perspective view of a connector module assembly including two of the connector modules of the first type, in a second or locked position.

The body 110 primarily defines a pair of terminal openings 120, each adapted to receive a conductive terminal therein (see FIG. 4). As shown, the body 110 only partially defines each terminal opening 120. Specifically, a section of each terminal opening 120 in the upper portion 112 of the body 110 is open on a first lateral side, and a section of another pair terminal openings 120 in the upper portion 112 is open on a second lateral side, opposite the first lateral side. The lower portion 114 further defines portions of a second pair of terminal openings 120 on the second lateral side. Similarly, the lower portion 114 defines portions of a third pair of terminal openings 120 on the first lateral side. As set forth in detail below with respect to FIGS. 4-8, each of the partial pairs of terminal openings 120 are completed via, for example, the mating of an additional one of the modules 100 on each of the first and second lateral sides of the body 110.

Still referring to FIGS. 1-3, the body 110 further defines a pair of connecting elements 130 extending from the first lateral side, in a lateral direction. The connecting elements 130 are adapted to detachably connect adjacent modules 100 together in a movable manner, and more specifically, movably connect adjacent modules between a first position and a second position.

Figure 22:
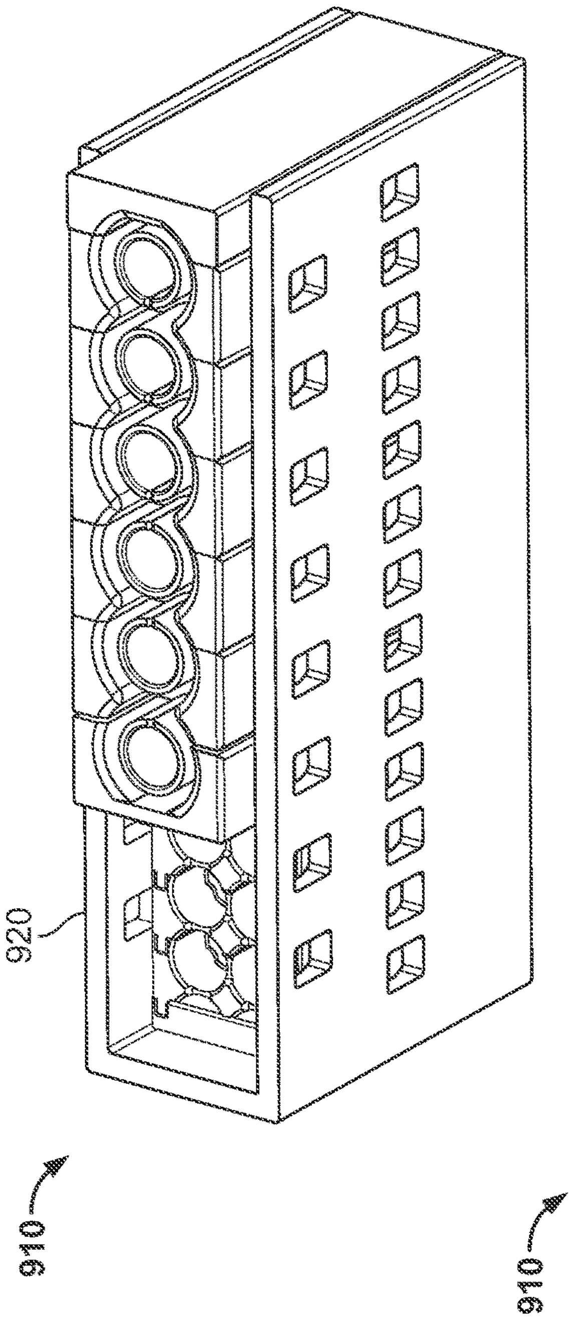
FIG. 22 is a perspective view of the connector module assembly of FIG. 21 in an intermediate connector assembly step.

In the exemplary illustrated embodiment, the connecting elements 130 may comprise TPA elements or protrusions 130. Each TPA element 130 defines a terminal stop or blocking protrusion 132 and a detent or latch 134 forming a portion of a TPA lock. The body 110 further defines a pair of corresponding TPA openings 136 formed on the second lateral side of the body 110. The TPA blocking protrusions 132 extend into a respective one of the terminal openings 120. As will be set forth in greater detail herein, the TPA elements 130 are adapted to engage with terminals inserted into the terminal openings 120 of an adjacent module 100. The body 110 further defines an exterior latch 139 protruding therefrom and adapted to secure the module to, for example, a frame (see FIG. 22). A mechanical stop of terminal seat 127 may be defined in each terminal opening 120 to limit the insertion depth of each terminal 140. Each terminal opening 120 may also have a primary terminal latch 129 (e.g., an elastic latch).

Figure 5:
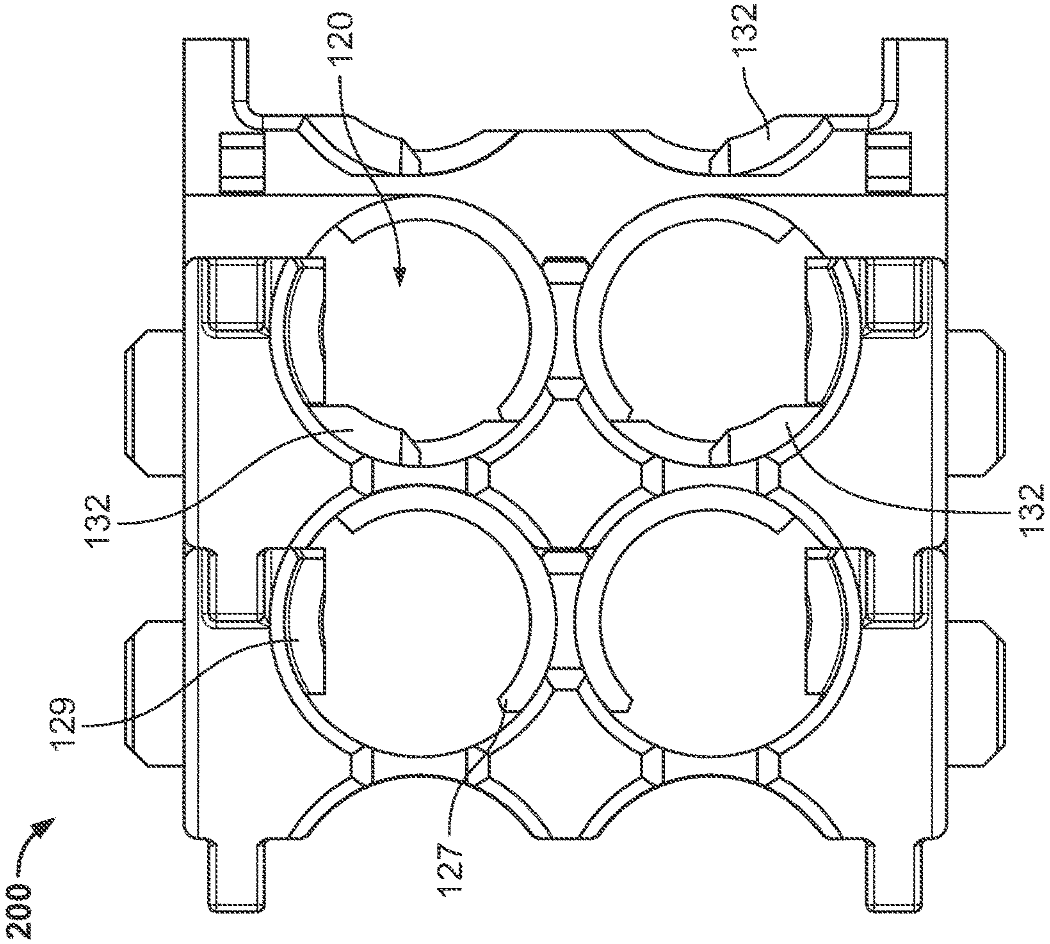
FIG. 5 is a top view of the connector module assembly of FIG. 4.
Figure 6:
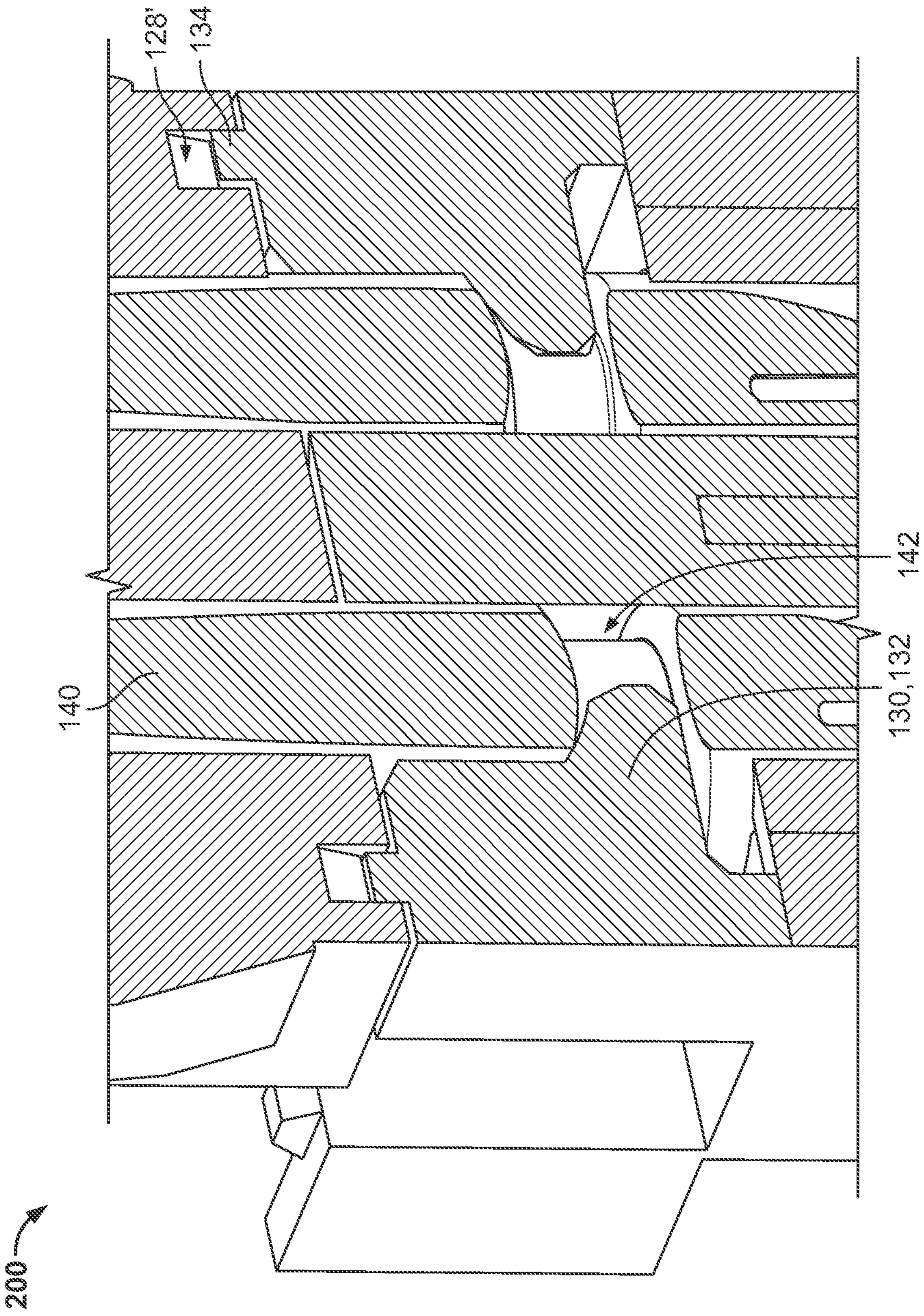
FIG. 6 is a partial cross-sectional perspective of the connector module assembly of FIG. 4.

Referring now to FIGS. 4-6, a connector module assembly 200 includes two of the connector modules 100,100' of the first type joined together. Specifically, the body 110 of the first of the modules 100 and the body 110' of the second of the modules 100' are movably connected to one another via the TPA elements 130. The bodies 110,110' are movable between a first or pre-stage position (see FIG. 7), and a second or locked position (see FIGS. 4-6 and 8). The TPA element 130 of the module 100 is inserted into the TPA opening 136' of the module 100'. In the second position, blocking protrusion 132 of each TPA protrusion 130 extends into a respective one of the terminal openings 120'. With the terminals 140 installed within the terminal openings 120', biasing the module 110 from the first position to the second position relative to the module 110' is operative to engage the blocking protrusions 132 in an annular recess 142 formed about each terminal. Once engaged, the TPA elements 130 prevent motion of the terminals 140 in an insertion direction. Further, as the module 110 cannot be biased into the second position if the terminal 140 is only partially installed within the terminal opening 120, successful biasing of the module 100 into the second position provides assurance during an assembly process that the terminals have been fully inserted into the module(s). As shown in FIG. 6, the latches or dents 134 of each TPA element 130 engage with corresponding recesses 128' of the body 110' in each of the first and second position. In this way, the module 110 can be fixed or locked in the first and second positions. Movement between the first and second positions is made possible via the application of enough force to dislodge the latches 134 from the recesses 128'.

Figure 8:
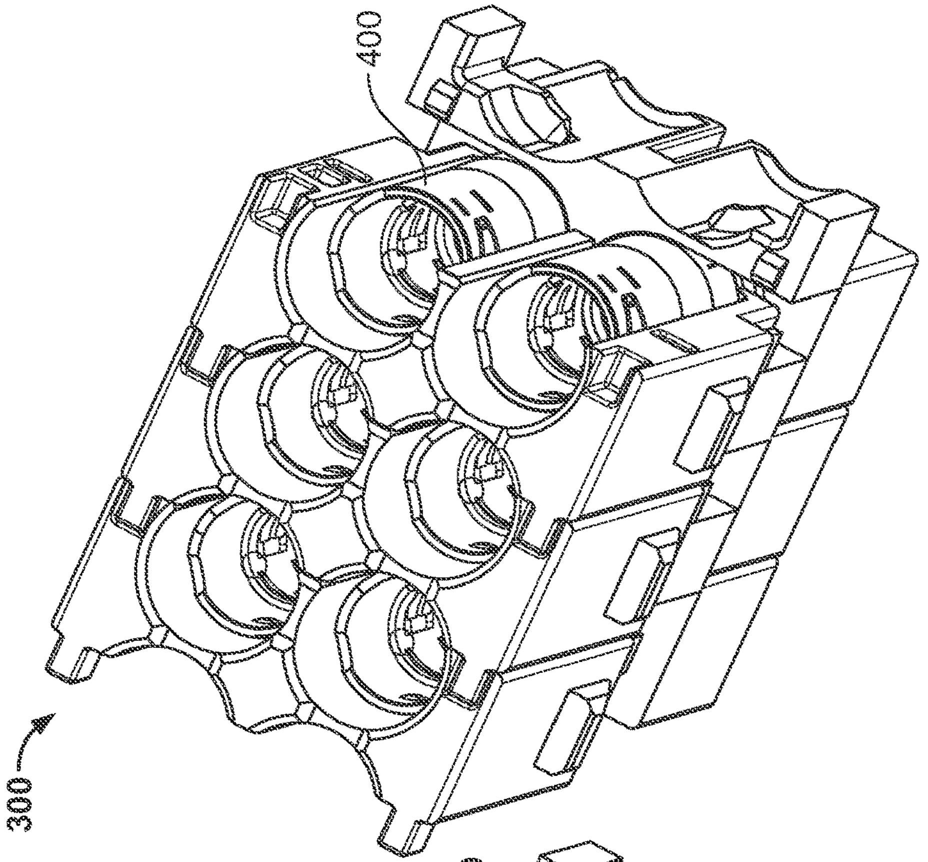
FIG. 8 is a perspective view of the connector module of FIG. 7 in the second position.
Figure 7:
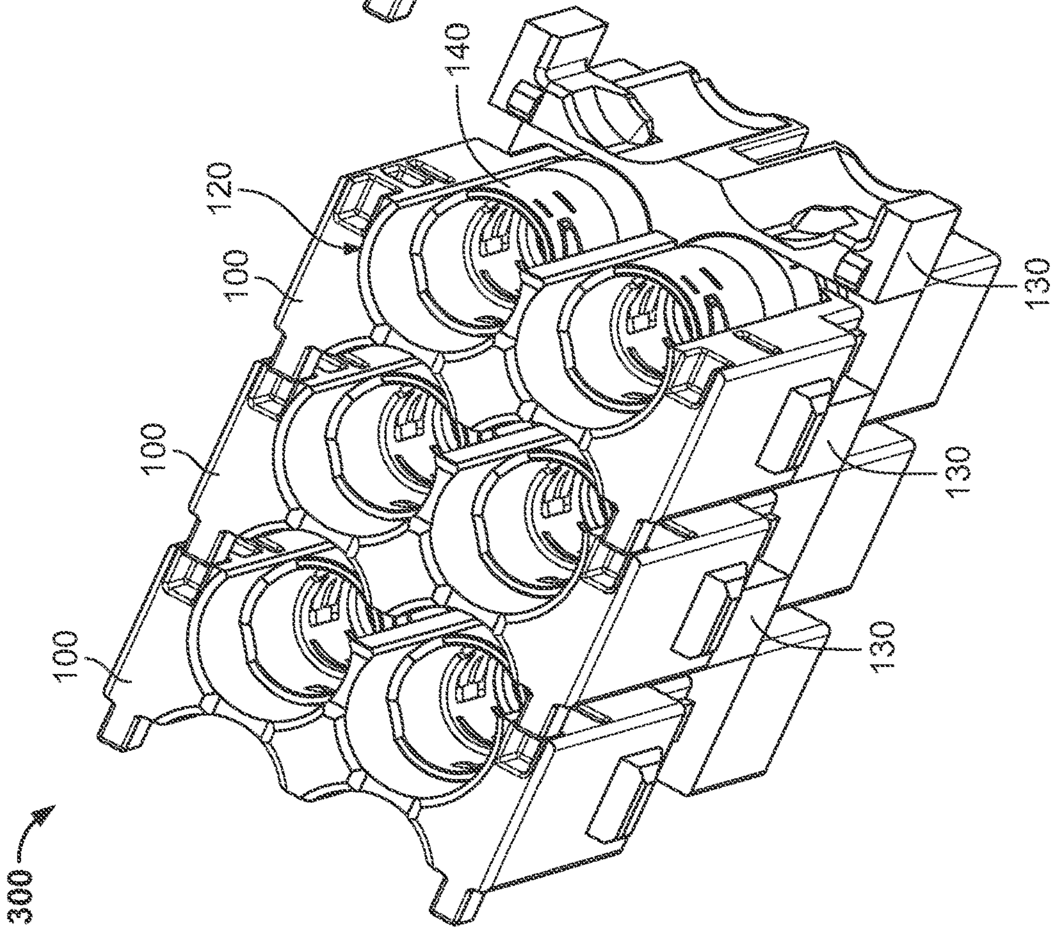
FIG. 7 is a top perspective view of another connector module assembly including three connector modules of the first type in a first or pre-stage position.
Figure 10:
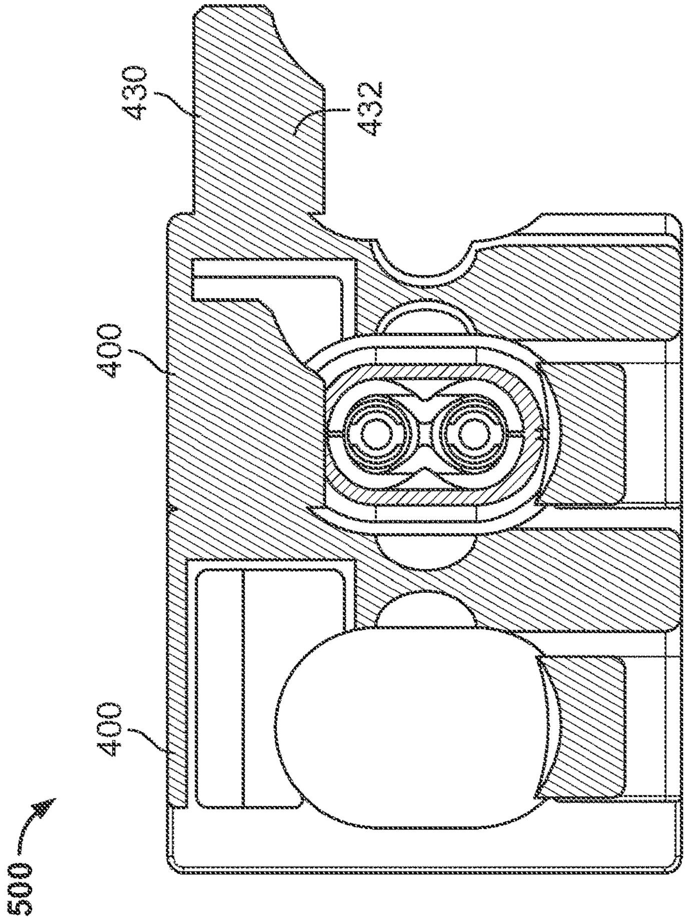
FIG. 10 is a top view of the connector module assembly of FIG. 9.

Similarly, as shown in FIGS. 7 and 8, a connector module assembly 300 includes three of the connector modules 100 of the first type joined together as described above. With the modules 100 in the first position shown in FIG. 7, the terminals 140 are insertable into respective terminal openings 120 in an insertion direction. As the TPA elements 130 are not engaged with or inserted into the terminal openings 120, the terminals 140 may be inserted without obstruction. Biasing the modules 100 into the second position relative to an adjacent module engages the TPA elements 130 with respective terminals 140, as shown in FIG. 8.

Referring again to FIG. 7, in the first position, the modules 100 define terminal openings 120 which are not coaxially aligned. Specifically, for a given terminal opening 120, a first portion thereof defined by one of the modules 100 is defined about a central axis that is offset from a central axis of a second portion of the terminal opening 120 defined by an adjacent module 100. Moving the modules 100 into the second position as shown in FIG. 8 coaxially aligns the central axes of the first and second portions of the terminal opening 120, thus forming the complete opening.

Figure 9:
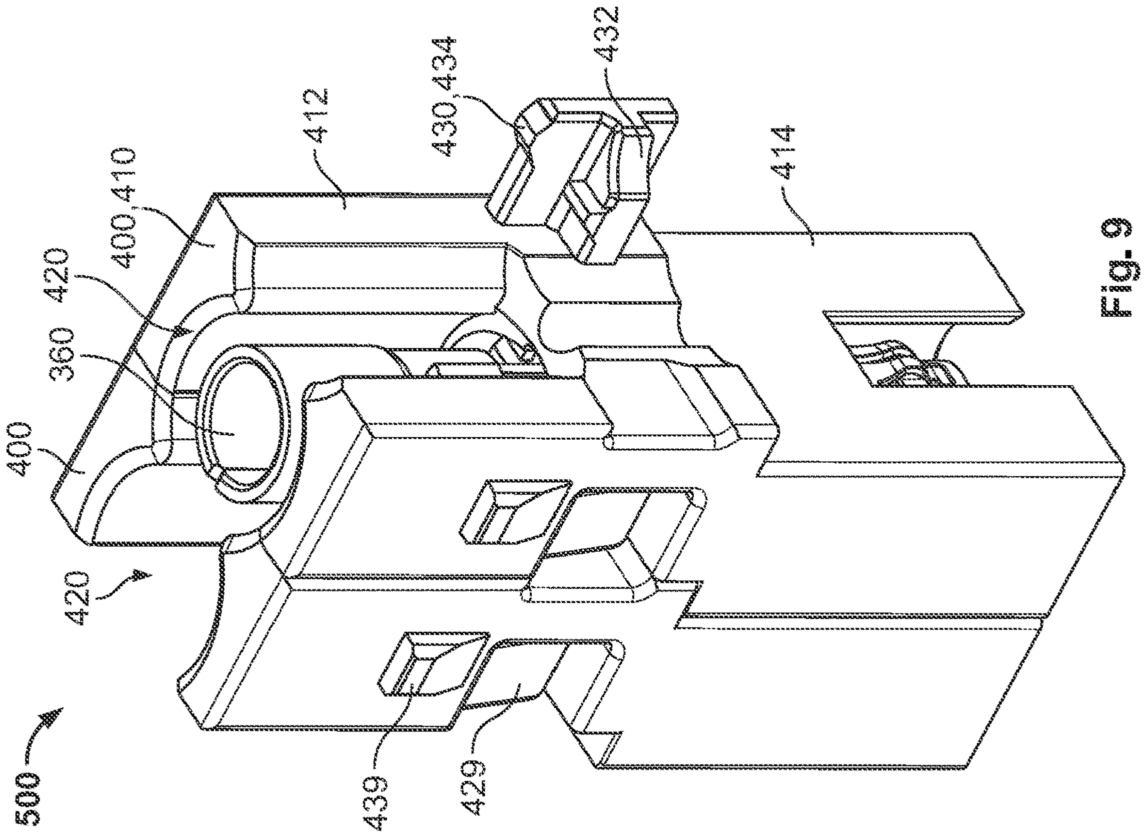
FIG. 9 is a perspective view of another connector module assembly including two connector modules of a second type in a second or locked position.
Figure 11:
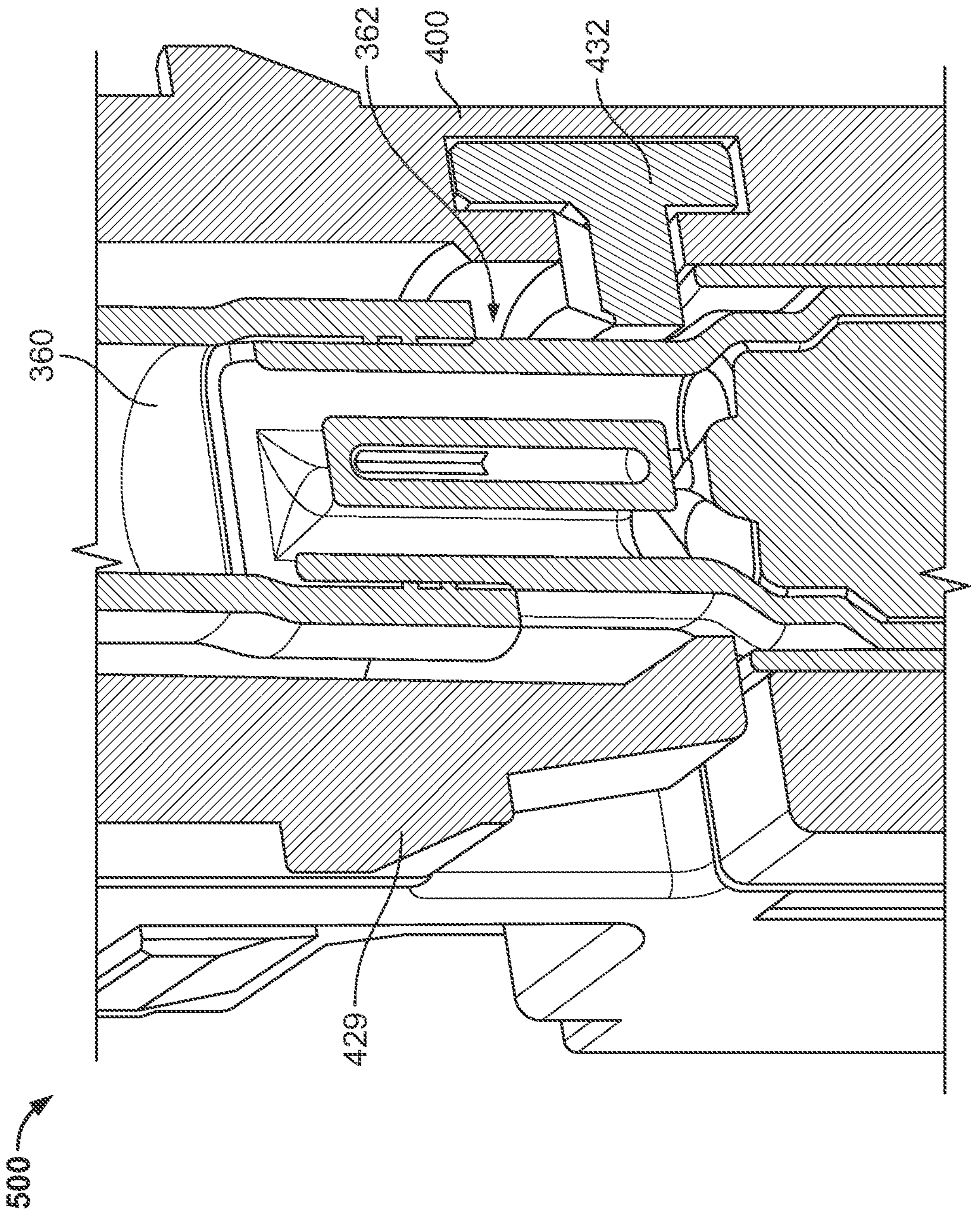
FIG. 11 is a partial cross-sectional perspective view of the connector module of FIG. 9.

Referring particularly to FIGS. 9-13, a connector module assembly or subassembly 500 according to another embodiment of the present disclosure includes a pair of interconnected connector modules 400 of a second type, distinct from the first type described above with respect to FIGS. 1-8. As shown, each module 400 is adapted to hold a single terminal 360 within a terminal opening 420 defined therein. Each module 400 includes a body or housing 410. The body 410 includes an upper portion 412 and a lower portion 414. As can be seen in FIG. 9, the upper and lower portions 412,414 are offset from one another in a lateral direction, similar to the module 100 described above. Similar to the module 100, the body 410 of the module 400 only partially defines each terminal opening 420. Each of the terminal opening 420 is completed via, for example, the mating of an additional one of the modules 400 on a side thereof, as illustrated.

The body 410 further defines a connecting element or protrusion, embodied again as TPA element or protrusion 430, extending from the second lateral side, in a lateral direction. The TPA element 430 defines a terminal stop or blocking protrusion 432 and a detent or latch 434. The body 410 includes corresponding TPA opening 436 formed in the second lateral side of the body 410. The TPA blocking protrusion 432 extends into the terminal opening 420 of an adjacent one of the modules 400 and engages with an annular recess 362 formed in the terminal 360. The body 410 further defines a primary terminal latch 429 securing the terminal 360 within the opening 420, as well as an outer latch 439 for securing the module 400 to an external connector component, such as a frame.

Figure 13:
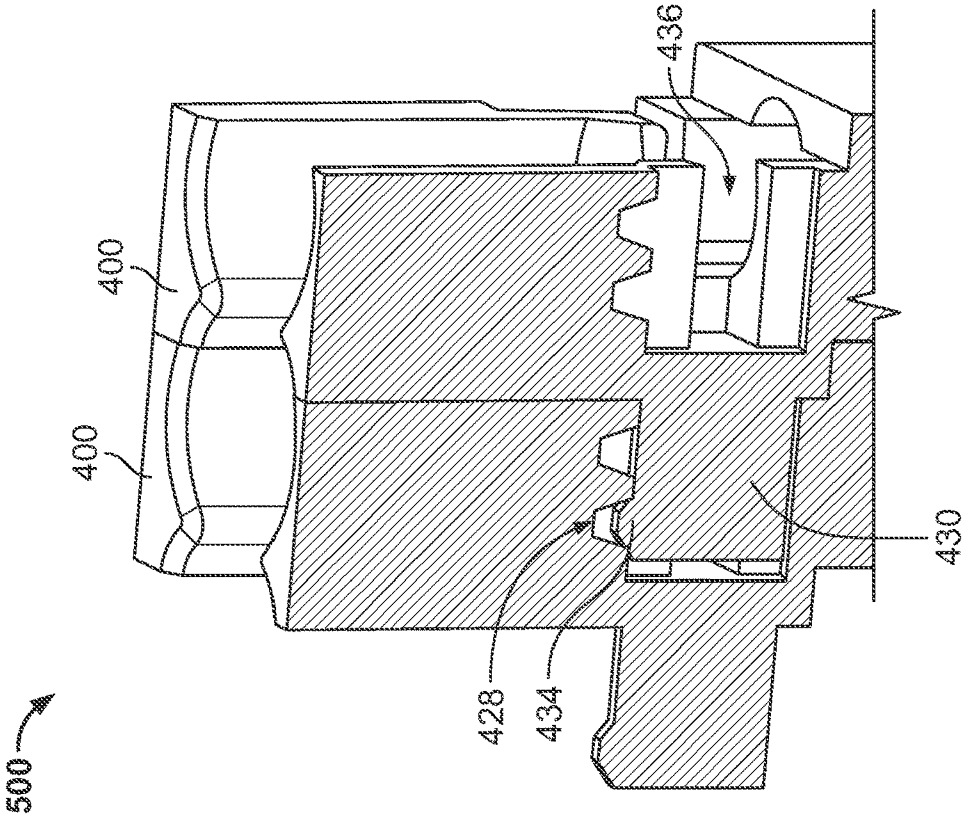
FIG. 13 is a partial cross-sectional perspective view of the connector module assembly of FIG. 9 in the second position.
Figure 12:
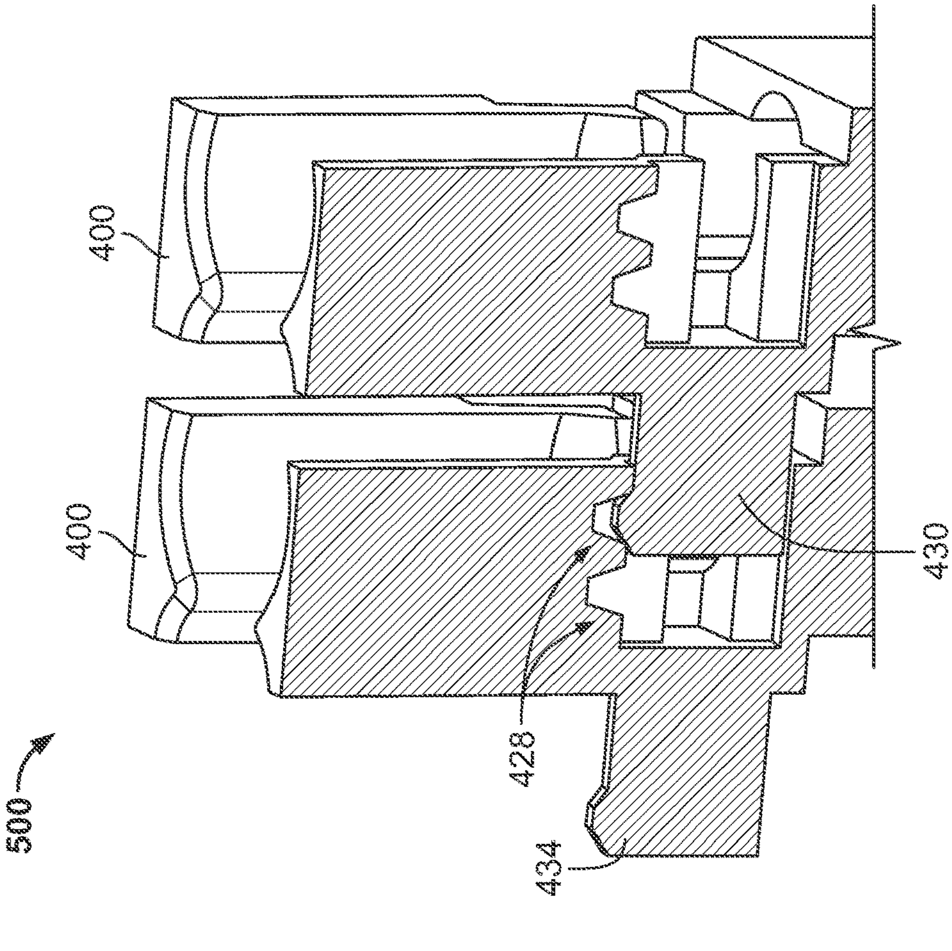
FIG. 12 is a partial cross-sectional perspective view of the connector module assembly of FIG. 9 in the first or pre-stage position.

The bodies 410 of the modules 400 are movably connected to one another via the TPA elements 430 between a first or pre-stage (FIG. 12), and a second or locked position (FIG. 13). The TPA element 430 of the module 400 is inserted into the TPA opening 436 of the adjacent module. In the second position, the blocking protrusion 432 extends into the terminal opening 420. With the terminal 360 installed within the terminal opening 420, biasing the module 400 from the first position to the second position relative is operative to engage the blocking protrusions 432 in the recess 362 formed in an exterior of each terminal. Once engaged, the TPA element 430 prevents motion of the terminals 360 in an insertion direction. Further, as the module 400 cannot be biased into the second position if the terminal 360 is only partially installed within the terminal opening 420, successful biasing of the module 400 into the second position provides assurance during an assembly process that the terminals have been fully inserted into the module(s). As shown most clearly in FIGS. 12 and 13, the latches or dents 434 of each TPA element 430 engage with corresponding recesses 428 of the body 410 in each of the first and second position. In this way, the module 400 can be fixed or locked in the first and second positions. Movement between the first and second positions is made possible via the application of enough force to dislodge the latches 434 from the recesses 428.

Figure 15:
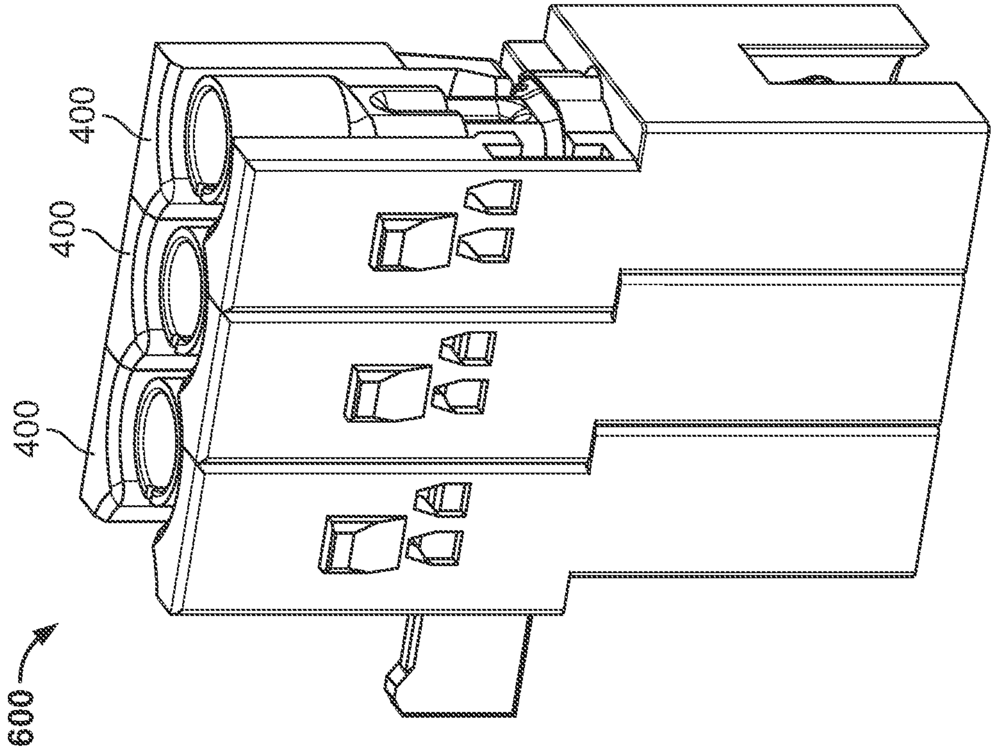
FIG. 15 is a perspective view of the connector module assembly of FIG. 14 in the second position.
Figure 14:
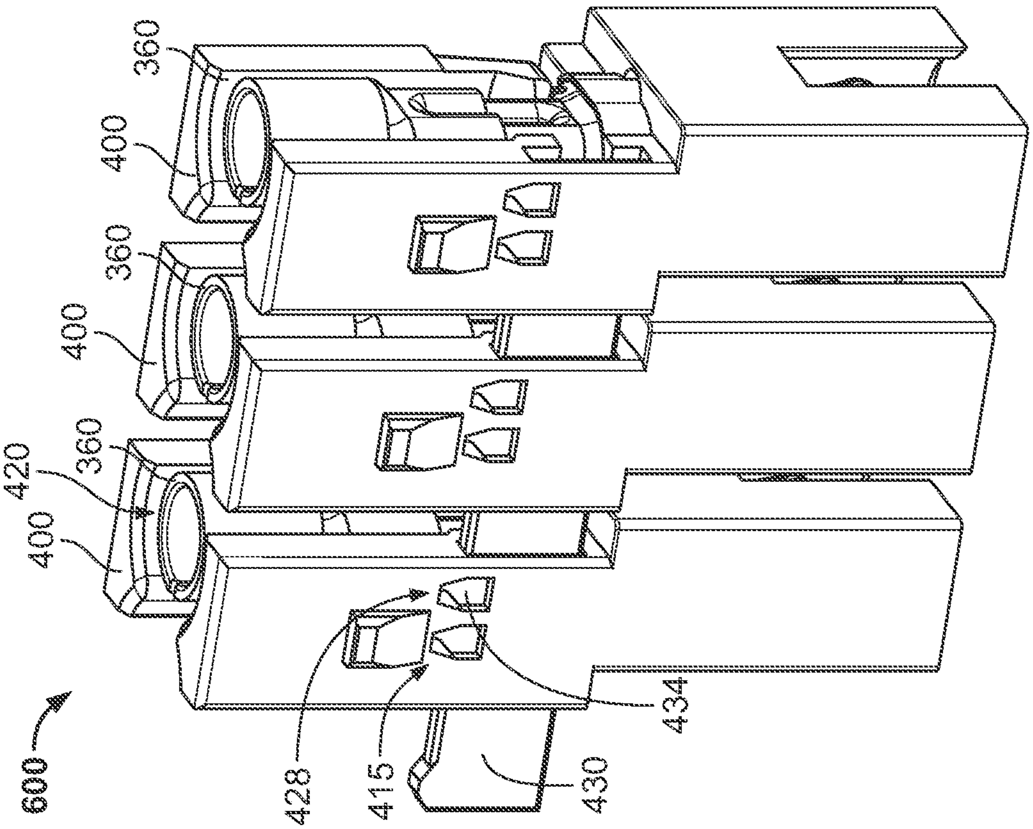
FIG. 14 is a perspective view of another connector module assembly including three connector modules of the second type in the first position.

Referring to FIGS. 14 and 15, a connector module assembly 600 includes three of the connector modules 500 of the second type joined together as described above. With the modules 500 in the first position (FIG. 14), the terminals 360 are insertable into respective terminal openings 420 in an insertion direction. Specifically, as the TPA devices 430 are not engaged with or inserted into the terminal openings 420, the terminals 360 may be inserted without obstruction. Viewing windows 415 may be formed through the body 210 in the area of the recesses 428 enabling an assembler to visual verify the engagement of the TPA latch 434 into either of the recesses 428. Biasing the modules 400 into the second position (FIG. 15) relative to an adjacent module engages the TPA elements 430 with respective terminals 360.

Figure 17:
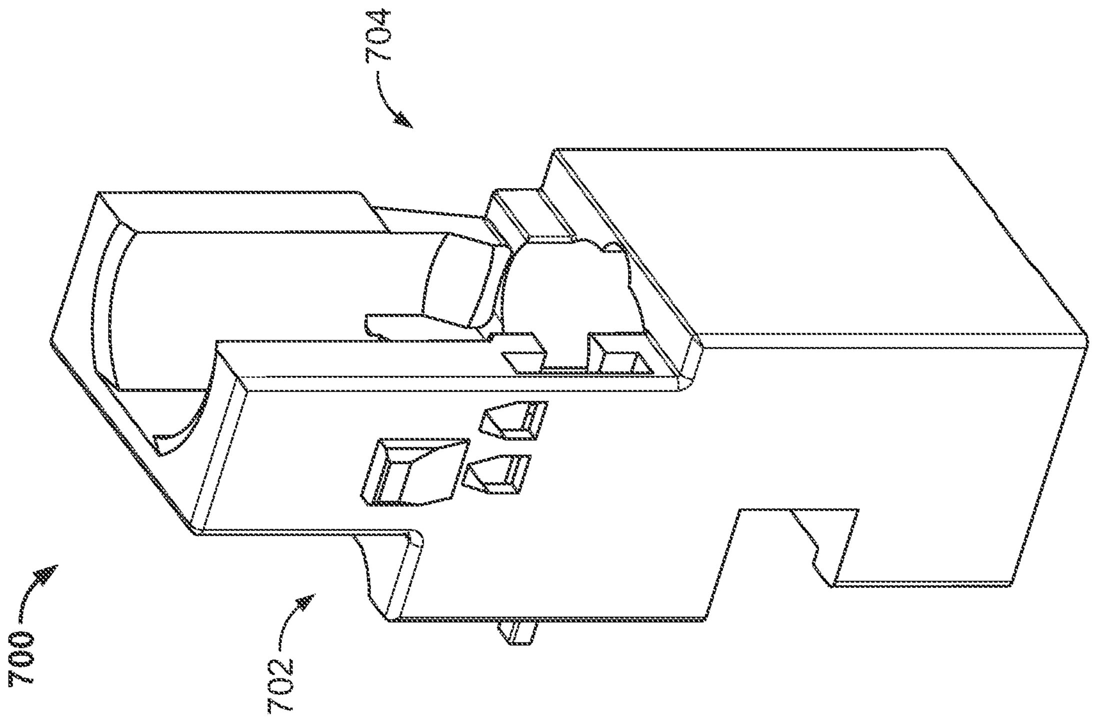
FIG. 17 is another perspective view of the adapter module of FIG. 16.
Figure 16:
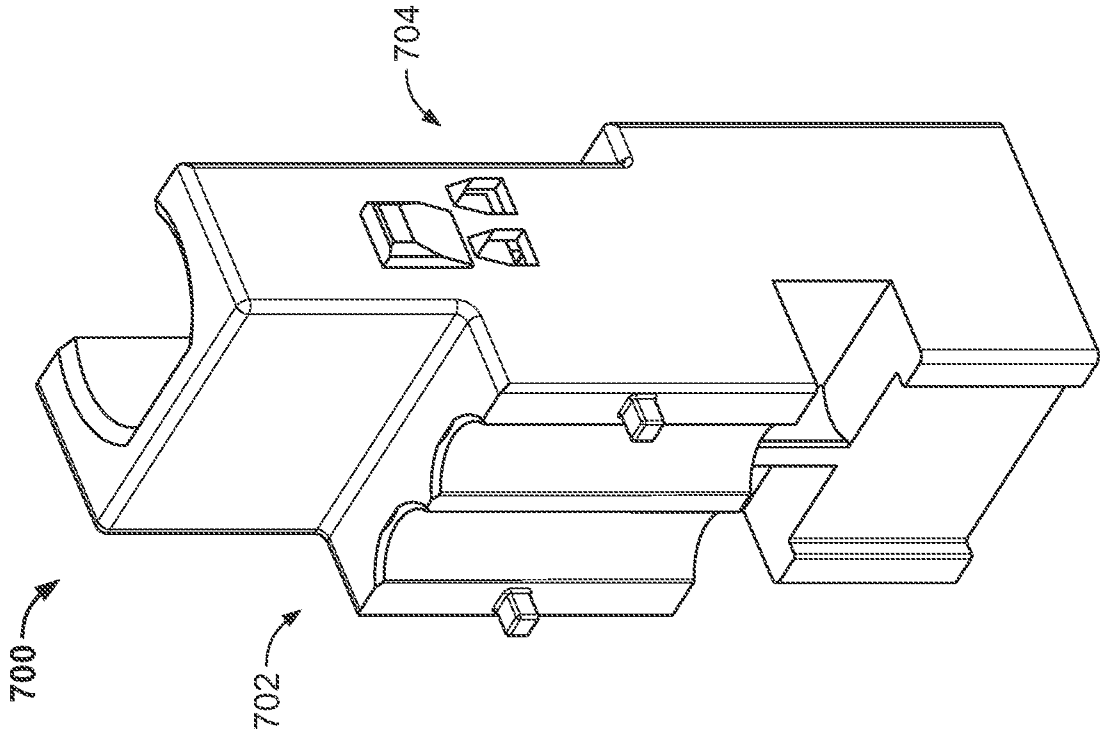
FIG. 16 is a perspective view of an adapter module or module housing according to an embodiment of the present disclosure.

FIGS. 16-19, illustrate adapter housing modules and end modules according to exemplary embodiments of the present disclosure. Specifically, FIGS. 16 and 17 illustrate an adapter module 700 suitable for joining modules of different types together in order to form a hybrid connector with minimal wasted space. The representative adapter module 700 includes a first side 702 having features corresponding to, for example, the first side of the module 100 shown and described in reference to FIGS. 1-8. In this way, the first side of the module 700 may be fitted to the second side of the module 100, and is likewise able to be biased between first and second positions for loading a terminal with a terminal opening defined thereby, and securing the terminal within the opening via the TPA protrusions, respectively. A second side 704 of the module 700 has features corresponding to, by way of example, the first side of the module 400 shown in FIGS. 9-15. In this way, the module 700 is used to connect one of more modules 100 of the first type with one or more modules of the second type 400 to form a hybrid connector subassembly 910, as shown in FIGS. 20 and 21 for example.

Figure 19:
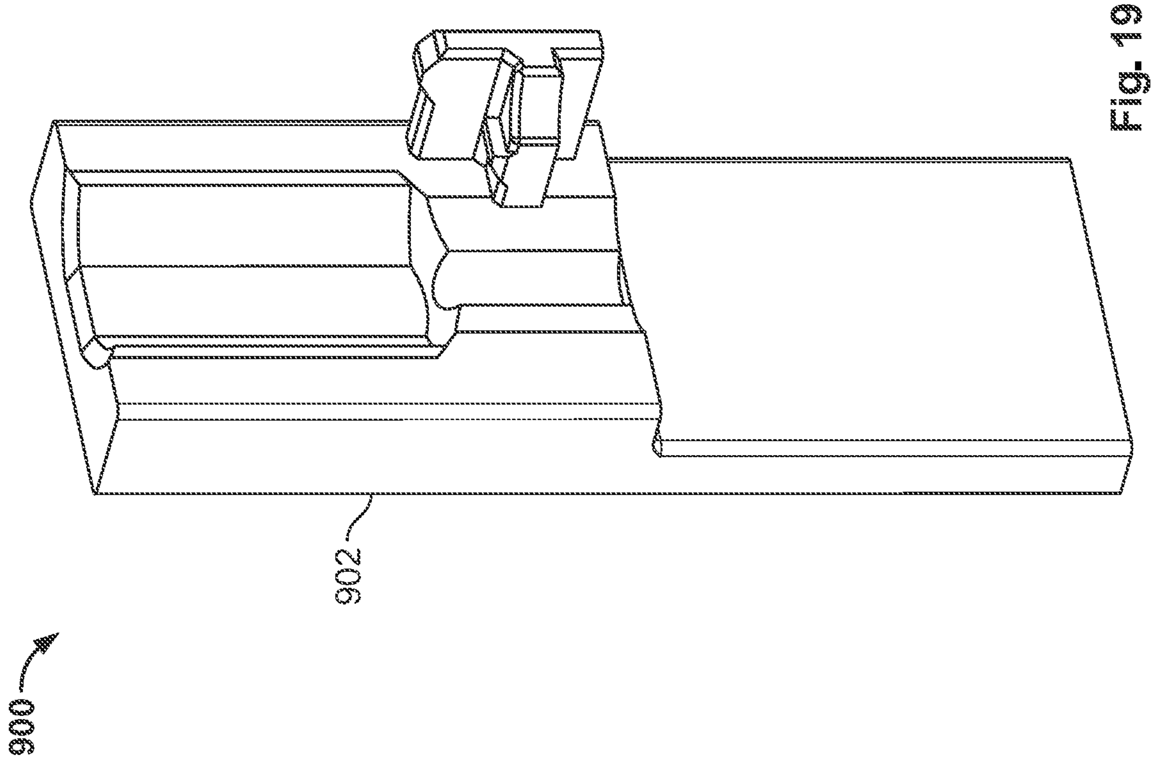
FIG. 19 is a perspective view of another end module according to an embodiment of the present disclosure.
Figure 18:
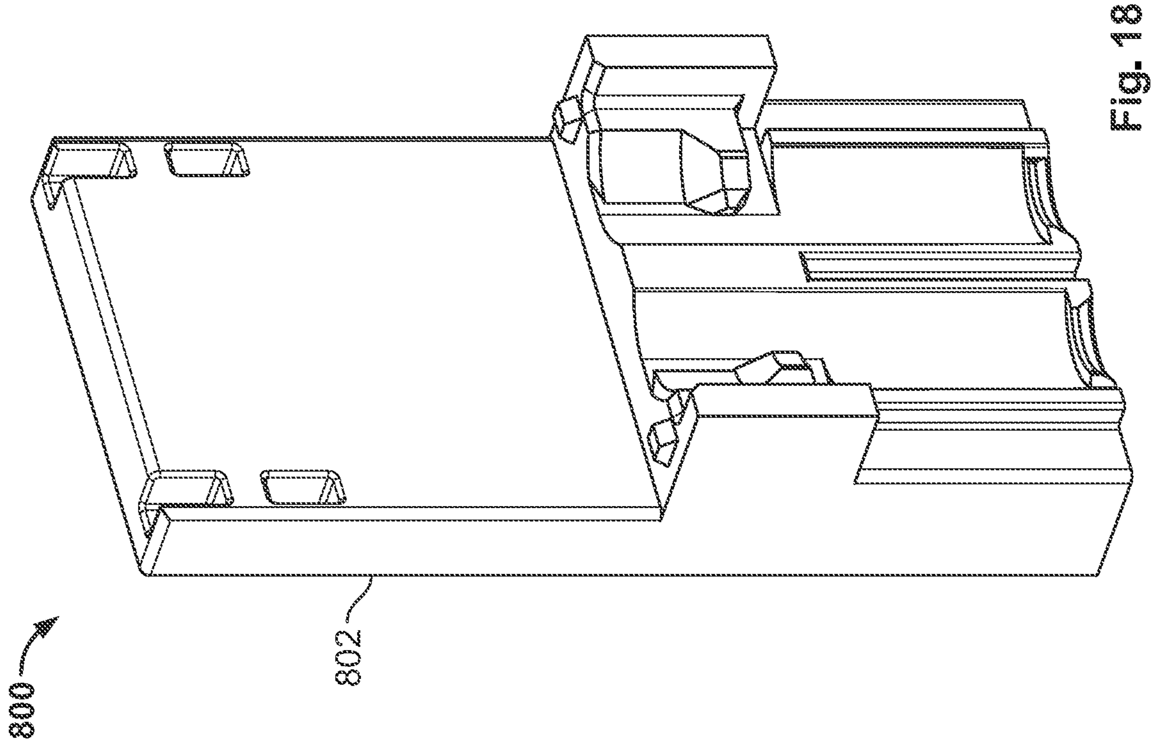
FIG. 18 is a perspective view of an end module or housing according to an embodiment of the present disclosure.
Figure 20:
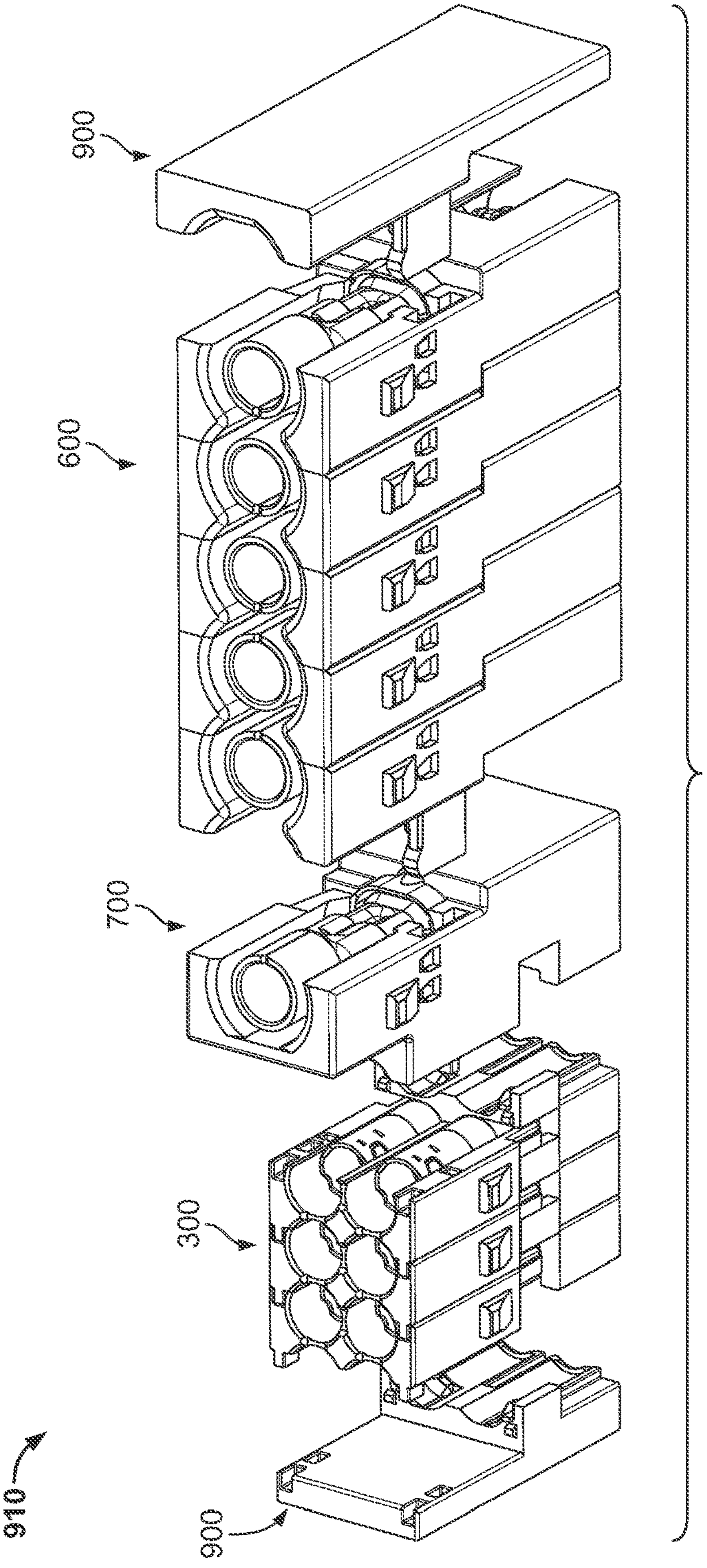
FIG. 20 is an exploded perspective view of a connector module assembly according to an embodiment of the present disclosure.

FIGS. 18 and 19 illustrate two distinct end modules or caps 800,900 for forming the hybrid connector 910 including, for example, connector housings of the first and second types as described above. The end modules 800 and 900 are used to cap an open end of a respective one of the first and second modules 100,400, and provide a generally planar external surface 802,902. The use of the adapted module 700 and end modules 800,900 minimizing connector width, while retaining the above-described advantages of the individual connector modules 100,400.

Figure 21:
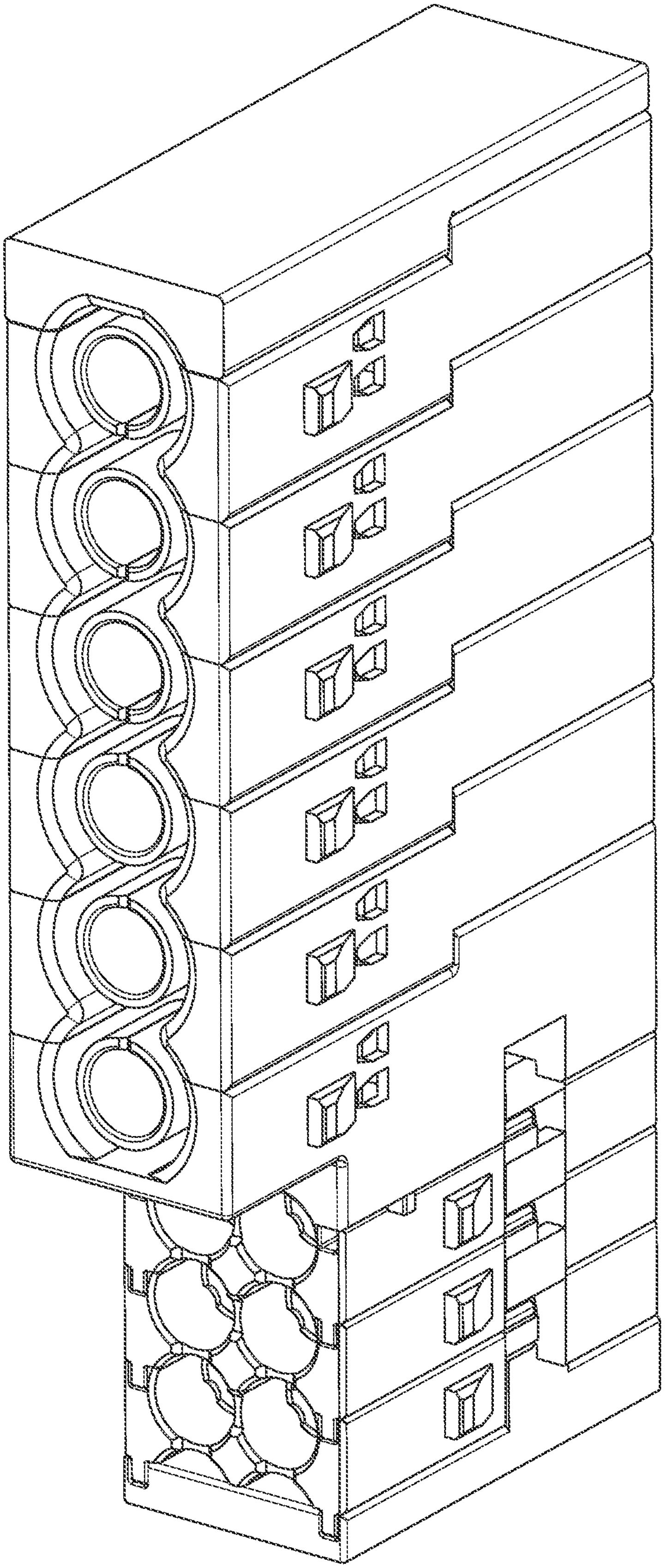
FIG. 21 is an assembled perspective view of the connector module assembly of FIG. 20.

With the hybrid connector subassembly 910 in the assembled state shown in FIG. 21, it may be inserted into a ladder frame 920, and positioned and locked therein via the external latches 139,439. The module ladder or ladder frame 920 provides for the precise alignment of the individual modules, and aligns the modules with mating elements (e.g., chicklets), reducing tolerance stacking. The module ladder 920 may also allow for individual modules to float in a plurality of directions, decreasing required mating force.

Figure 23:
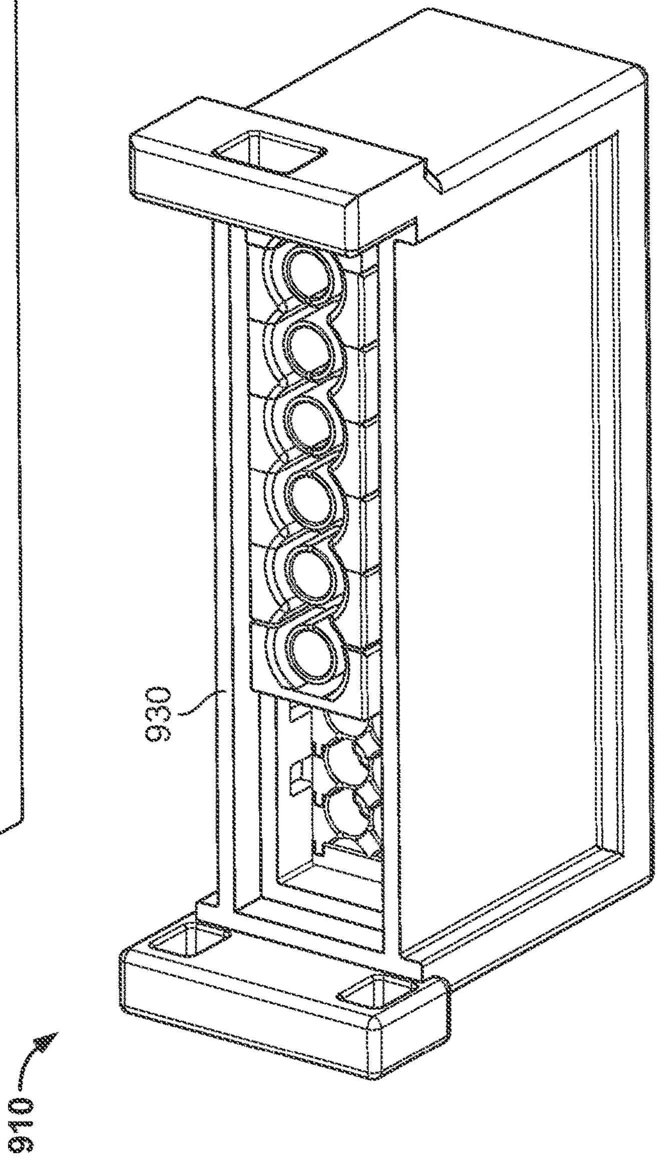
FIG. 23 is a perspective view of the connector module assembly of FIG. 22 in another intermediate connector assembly step.
Figure 24:
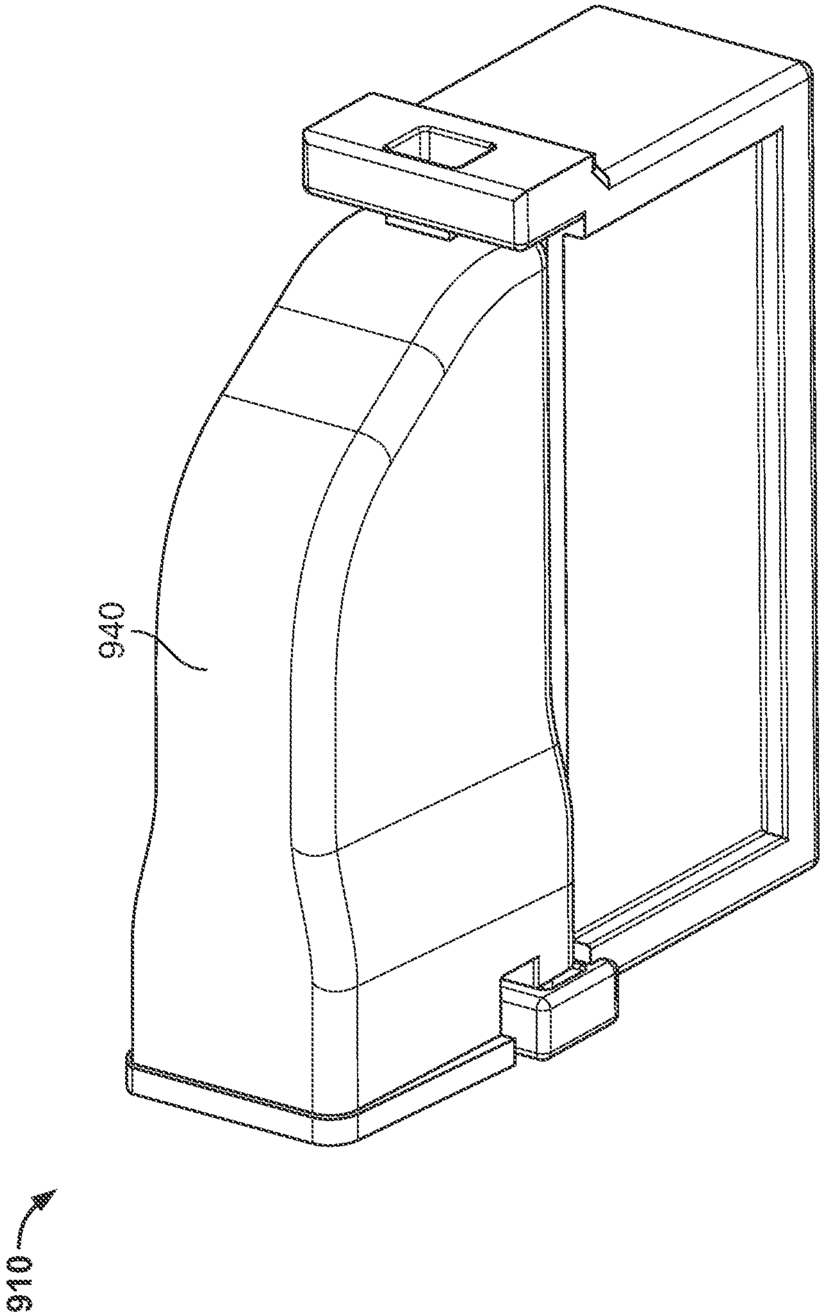
FIG. 24 is a perspective view of the connector module assembly of FIG. 22 in another intermediate connector assembly step.
Figure 25:
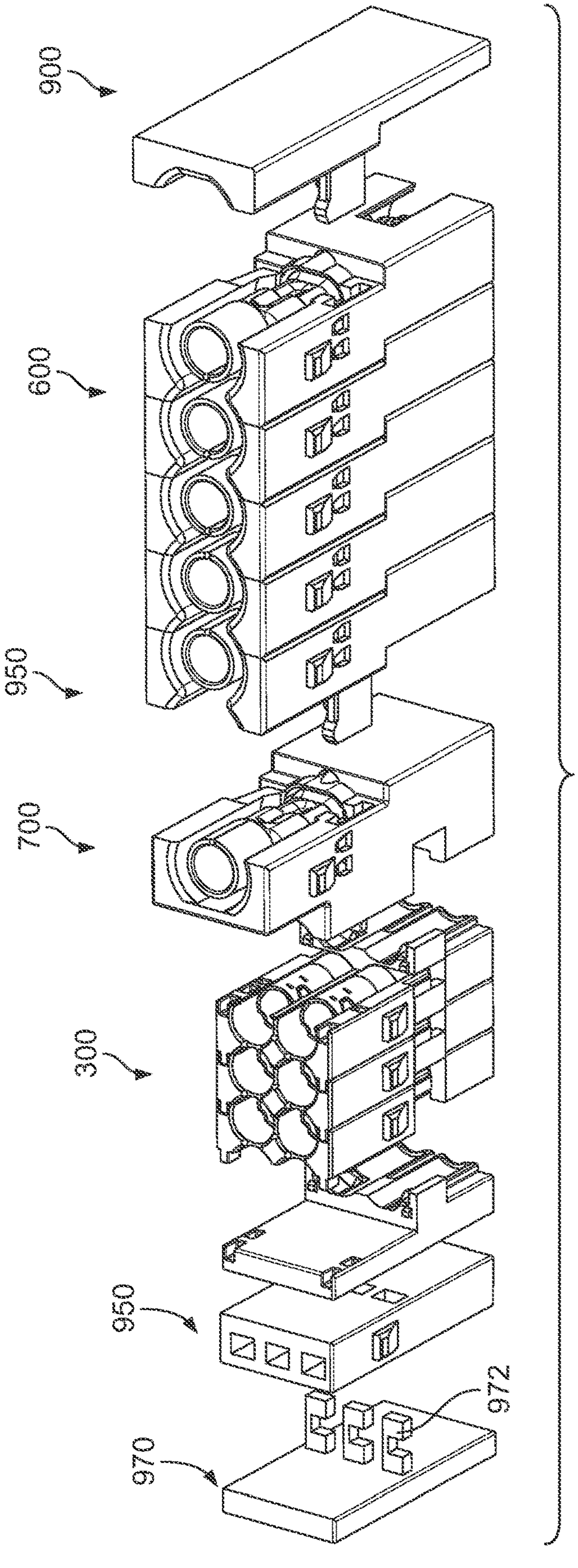
FIG. 25 is an exploded perspective view of a connector module assembly according to an embodiment of the present disclosure.
Figure 27:
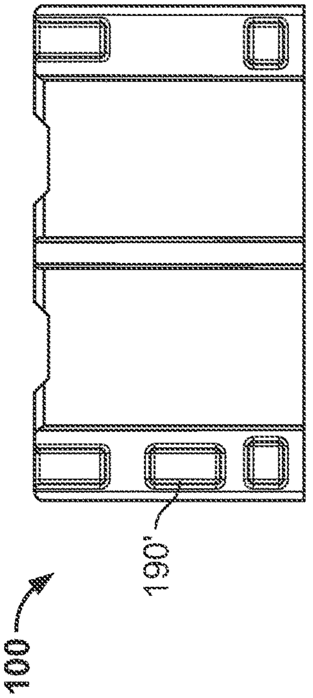
FIG. 27 is a partial front view of another connector module according to an embodiment of the present disclosure illustrating a coding feature.
Figure 28:
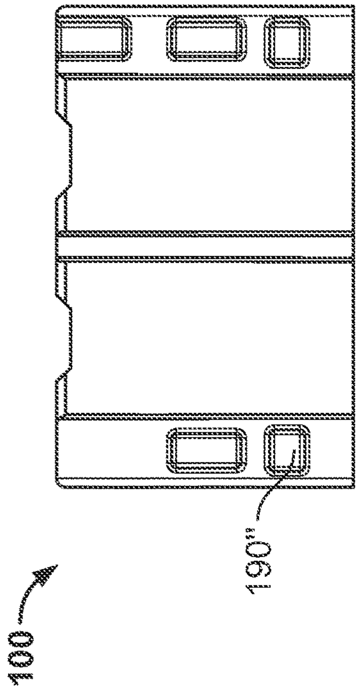
FIG. 28 is a partial front view of another connector module according to an embodiment of the present disclosure illustrating a coding feature.
Figure 29:
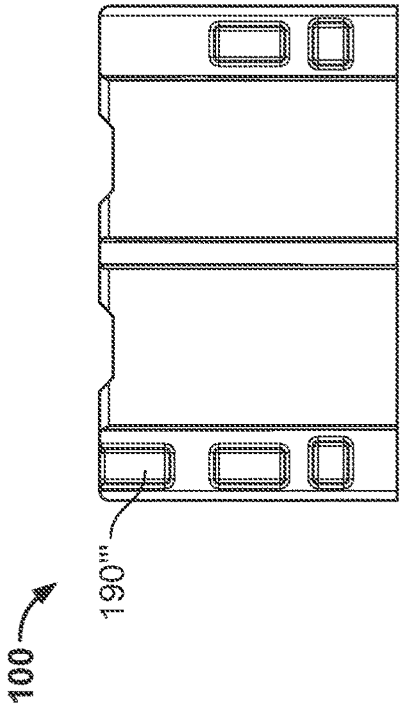
FIG. 29 is a partial front view of another connector module according to an embodiment of the present disclosure illustrating a coding feature.
Figure 26:
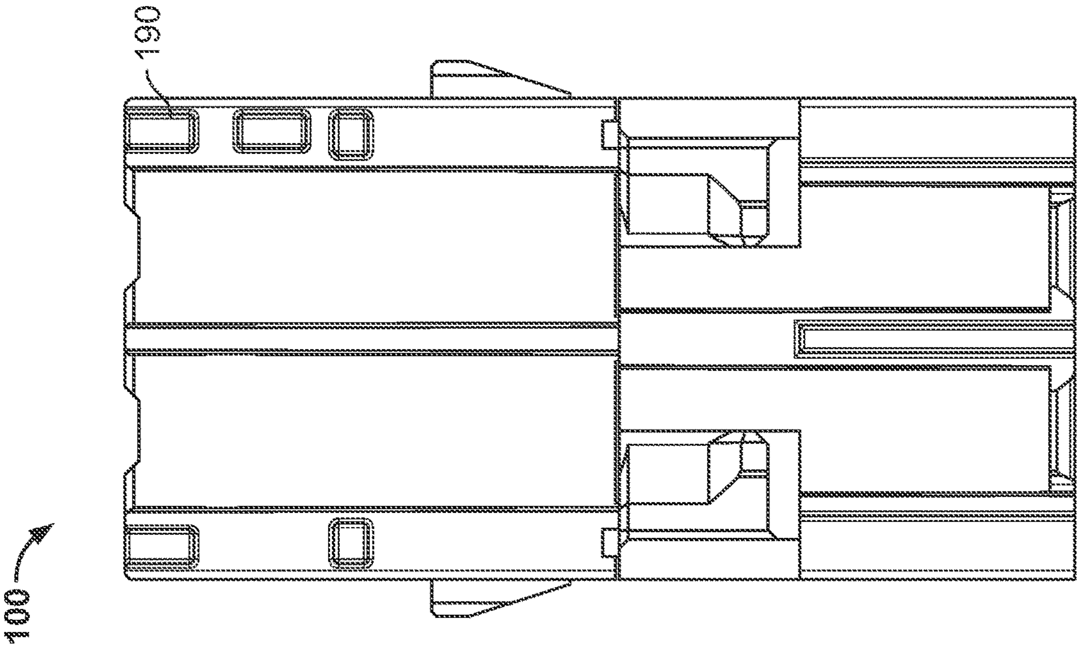
FIG. 26 is a front view of the connector module of FIG. 1 illustrating a coding feature.

The resulting assembly is insertable into an outer connector housing 930 (FIG. 23), onto which a mating connector 940 (FIG. 24) may be fitted for electrically connecting to the terminals 140,360. FIG. 25 is an exploded view of another module subassembly 950 which includes a module 960 of a third type. A third end module 970 may define a TPA device 972 for engaging with terminals arranged within the module 960.

As shown in FIGS. 26-29, using the module 100 as an example, each module may be formed with a unique coding thereon 190,190',190",190""identifying the type(s) of modules (e.g., modules 100,400) which may be mated thereto, and/or what adapters (e.g., adapter 700) or end module (e.g., end modules 800,900) mateable thereto. Coding the individual modules 100 allows for, for example, 4 different modules to create 16 unique coding combinations, which in turn lessens tooling costs associated with an increased number of required modules and adapters.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A modular connector assembly, comprising:
- a plurality of interconnectable bodies, including:
  - a first body defining at least a first portion of a first terminal space sized to receive a terminal of a first type in a terminal insertion direction; and
  - a second body identical to the first body; and
- a same connecting element defined on each of the first body and the second body, a first connecting element on one of the first body or the second body detachably connecting the first body to the second body, the second body is movable between a first position and a second position relative to the first body via the first connecting element, the first connecting element includes a terminal position assurance (TPA) element, with the second body in the first position, the terminal is insertable into the first terminal space in the insertion direction, and with the second body in the second position, the TPA element is adapted to fix the terminal within the first terminal space, the second body is attached to the first body in the first position and the second position, the first connecting element has a latch that engages with a first recess of the other of the first body or the second body in the first position and engages with a second recess of the other of the first body or the second body in the second position, the first connecting element moves linearly between engagement with the first recess and engagement with the second recess.

2. The modular connector of claim 1, wherein the second body defines a second portion of the first terminal space.

3. The modular connector of claim 2, wherein:
- with the second body in the first position, the first and second portions of the first terminal space are defined about discrete, radially offset central axes; and
- with the second body in the second position, the first and second portions of the first terminal space are defined about a common central axis.

4. The modular connector of claim 1, wherein the second body defines the terminal position assurance (TPA) element connecting the first body and the second body, the TPA element arranged outside of the first terminal space in the first position and arranged within the first terminal space in the second position for engaging with the terminal.

5. The modular connector of claim 4, wherein the TPA element comprises a TPA protrusion extending from the second body toward the first body.

6. The modular connector of claim 5, further comprising a terminal of the first type arranged within the terminal space, wherein with the second body in the second position, the TPA protrusion engages with a groove formed in the terminal, misalignment of the TPA protrusion and the terminal groove preventing the second body from moving from the first position into the second position.

7. The modular connector of claim 5, wherein the first body defines an opening sized to receive the TPA protrusion as the second body is moved into the second position.

8. The modular connector of claim 1, wherein the first body defines at least a portion of a second terminal space on a side opposite the first terminal space, the second terminal space sized to receive another terminal of the first type in the insertion direction.

9. The modular connector of claim 8, wherein the plurality of interconnected bodies further includes an end housing connectable to a side of the first housing opposite the second housing and defining:
- a second portion of the second terminal space on a first side thereof; and
- a planar end face on a second side thereof, opposite the first side.

10. The modular connector of claim 9, wherein one of the first housing or the end housing defines a TPA element adapted to fix another terminal of the first type within the second terminal space with the end housing connected to the first housing.

11. The modular connector of claim 8, wherein the plurality of interconnected bodies further includes an adapter housing connectable to a side of the first housing opposite the second housing and defining:
- a second portion of the second terminal space on a first side thereof; and
- a first portion of a third terminal space on a second side thereof, opposite the first side, the third terminal space sized to receive a terminal of a second type, distinct from the first type, in an insertion direction.

12. The modular connector of claim 11, wherein the plurality of interconnected bodies further includes a third body connectable to the second side of the adapter housing and defining:
- a second portion of the third terminal space on a first side thereof; and a first portion of a fourth terminal space on a second side thereof, opposite the first side, the fourth terminal spaced sized to receive another terminal of the second type in the insertion direction.

13. The modular connector of claim 1, wherein the first body and the second body define a complementary coding on abutting mating surfaces thereof.

14. A modular connector assembly, including:

a plurality of detachably connected first terminal housings, each first terminal housing defining at least a portion of a first terminal space sized to receive a terminal of a first type; and a plurality of detachably connected second terminal housings, each second terminal housing defining at least a portion of a second terminal space sized to receive a terminal of a second type, distinct from the first type; and an adapter housing detachably connecting the plurality of first terminal housings to the plurality of second terminal housings.

15. The modular connector assembly of claim 14, wherein each of the first terminal housings are identical and each of the second terminal housings are identical.

16. The modular connector assembly of claim 14, wherein adjacent first terminal housings and adjacent second terminal housings cooperate to form the respective first and second terminal spaces therebetween.

17. The modular connector assembly of claim 16, wherein:

each first terminal housing is movably connected to an adjacent first terminal housings between a first position and a second position;

with the first terminal housing in the first position, the terminal is insertable into the first terminal space defined between the first terminal housing and the adjacent first terminal housing in the insertion direction; and with the first terminal housing in the second position, the terminal is fixed within the first terminal space by a TPA element of the adjacent first terminal housing.

18. A modular connector assembly, comprising:

a plurality of interconnectable bodies, including:

a first body defining at least a first portion of a first terminal space sized to receive a terminal of a first type in a terminal insertion direction, the first body defines at least a portion of a second terminal space on a side opposite the first terminal space, the second terminal space sized to receive another terminal of the first type in the insertion direction;

a second body; and an end housing connectable to a side of the first body opposite the second body and defining a second portion of the second terminal space on a first side thereof and a planar end face on a second side thereof, opposite the first side; and a connecting element defined on at least one of the first body or the second body and detachably connecting the first body to the second body.

19. A modular connector assembly, comprising:

a plurality of interconnectable bodies, including:

a first body defining at least a first portion of a first terminal space sized to receive a terminal of a first type in a terminal insertion direction, the first body defines at least a portion of a second terminal space on a side opposite the first terminal space, the second terminal space sized to receive another terminal of the first type in the insertion direction;

a second body; and an adapter housing connectable to a side of the first body opposite the second body and defining a second portion of the second terminal space on a first side thereof, and a first portion of a third terminal space on a second side thereof, opposite the first side, the third terminal space sized to receive a terminal of a second type, distinct from the first type, in the insertion direction; and a connecting element defined on at least one of the first body or the second body and detachably connecting the first body to the second body.

* * * * *